United States Patent [19]

Sturdevant

[11] Patent Number: 5,414,940

[45] Date of Patent: May 16, 1995

[54] CONTACT POSITION SENSOR USING CONSTANT CONTACT FORCE CONTROL SYSTEM

[75] Inventor: Jay Sturdevant, Ridgefield, Conn.

[73] Assignee: Hughes Aircraft Company, Los Angeles, Calif.

[21] Appl. No.: 64,605

[22] Filed: May 19, 1993

[51] Int. Cl.⁶ .................................. G01B 7/28
[52] U.S. Cl. ......................... 33/559; 33/561; 364/559
[58] Field of Search ............... 33/559, 503, 504, 556, 33/815, 558, 561, DIG. 2; 364/559

[56] References Cited

U.S. PATENT DOCUMENTS

| 3,750,298 | 8/1973 | Turner | 33/DIG. 2 |
| 4,490,913 | 1/1985 | Vis | 33/558 |
| 4,492,034 | 1/1985 | Nishina et al. | 33/815 |
| 4,621,434 | 11/1986 | Hirschmann | 33/558 |
| 4,873,771 | 10/1989 | Wüst | 33/815 |
| 5,012,591 | 5/1991 | Asakawa | 33/561 |
| 5,018,278 | 5/1991 | Aehnelt et al. | 33/559 |
| 5,105,554 | 4/1992 | Schnyder et al. | 33/815 |
| 5,136,789 | 8/1992 | Burton | 33/559 |

Primary Examiner—Christopher W. Fulton
Attorney, Agent, or Firm—W. C. Schubert; W. K. Denson-Low

[57] ABSTRACT

A force control system (50) and method are provided for controlling a position contact sensor (10) so as to produce a constant controlled contact force therewith. The system (50) includes a contact position sensor (10) which has a contact probe (12) for contacting the surface of a target to be measured and an output signal ($V_o$) for providing a position indication thereof. An actuator (30) is provided for controllably driving the contact position sensor (10) in response to an actuation control signal (I). A controller (52) receives the position indication signal ($V_o$) and generates in response thereto the actuation control signal (I) so as to provide a substantially constant selective force (F) exerted by the contact probe (12). The actuation drive signal (I) is generated further in response to substantially linear approximation curves based on predetermined force and position data attained from the sensor (10) and the actuator (30).

21 Claims, 4 Drawing Sheets

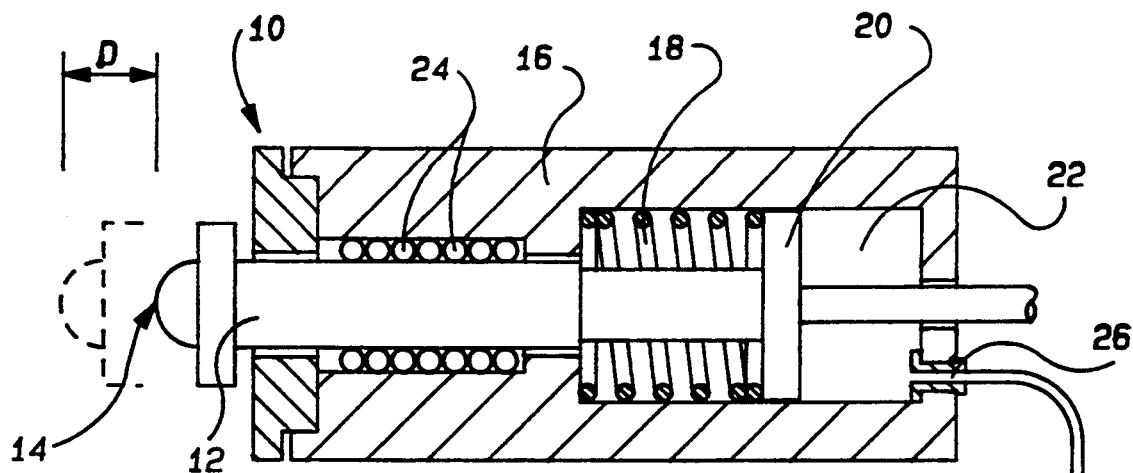
Fig-1
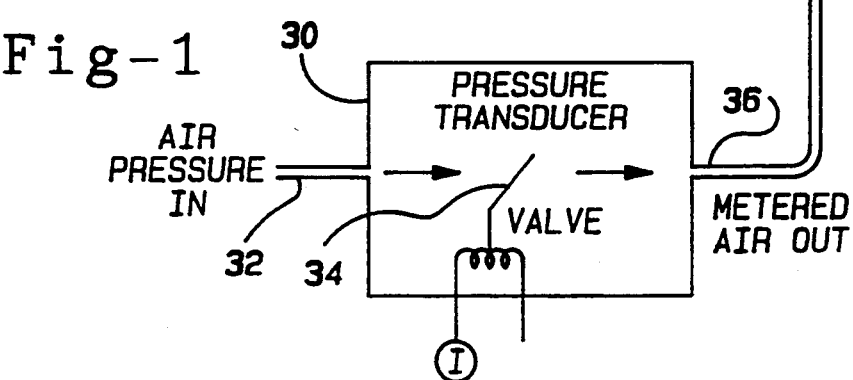
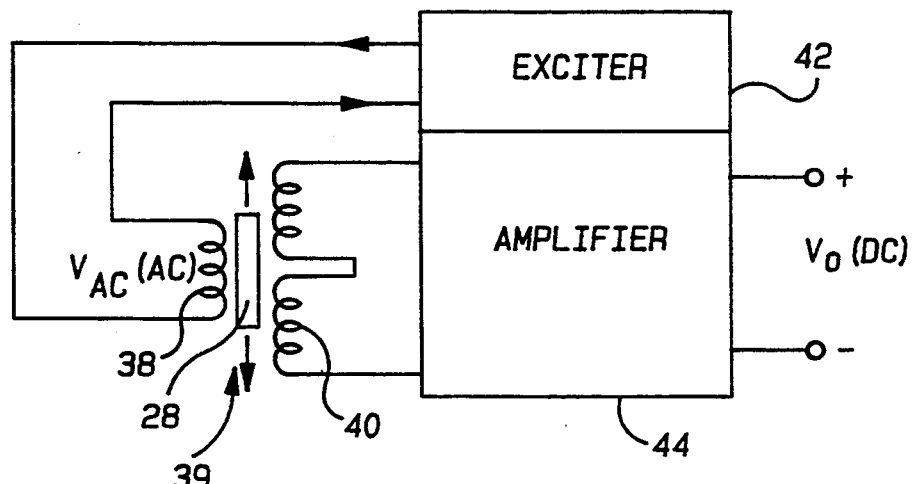
Fig-2

CONTACT POSITION SENSOR USING CONSTANT CONTACT FORCE CONTROL SYSTEM

This invention herein described has been made in the course of or under U.S. Government Subcontract No. DSO508NL9S with the National Aeronautical Space Agency (NASA). The invention described herein was made in performance of work under NASA contract No. NAS8-37710, and is subject to the provisions of Section 305 of the National Aeronautics and Space Act of 1958, as amended (42 USC 2457).

BACKGROUND OF THE INVENTION

1. Technical Field

This invention relates generally to position sensing systems and, more particularly, to a contact sensor position measurement control system and method which provides constant contact force control.

2. Discussion

Position measurement sensors are commonly employed to perform measurement operations to measure a physical variable of position and/or displacement (i.e., change of position) of a desired surface. Generally speaking, some of the more precise conventional position measurement sensors are also known as measurement transducers and generally include a moveable mechanical probe that extends and retracts relative to the surface being measured. In response to such movement, the position sensors typically generate an electrical signal which represents the movement of the probe in relation to the surface and thereby defines the measured position or displacement thereof.

A wide number of position measurement sensors currently exist which include both contact and non-contact probe arrangements. .Non-contact position sensors include the use of interferometry in which an optical beam is transmitted from a light source (probe) through a lens which divides and transmits half the beam to the surface to be measured and the remaining half of the beam to a reference optical surface. Each beam is reflected back to an optical measurement device such as a radiometer with necessary electronics. The measurement device operates to detect interference fringes produced by the two reflected beams which are then counted and analyzed in order to determine the separation distance therebetween. The separation distance thereby enables the user to determine the position thereof and the displacement between the probe and the surface being measured.

In the past, interferometry has been known to provide highly accurate position measurement results. However, the more recently developed systems employing interferometry are generally overly complex and expensive. Less expensive optical systems do exist which use a fiber optic probe for transmitting an optical beam off of the surface to be measured and measuring the reflected light beam intensity as a function of the position of the probe. However, the commercially available optical sensors are generally only capable of operating with precision and repeatability over a very limited linear range. In addition, optical sensors usually have relatively low reliability and difficult calibration procedures. Furthermore, optical sensors are easily susceptible to interference and are especially sensitive to contamination problems.

Other types of conventional non-contact position sensors include capacitance transducers and eddy current based sensors. The capacitance transducer technique generally requires a conductive surface which forms a capacitive coupling with a separate but closely spaced plate. The eddy current sensors require magnetically induced circuits on the probe and surface being measured. However, these non-contact sensors frequently suffer from low reliability and it is therefore difficult to ensure highly accurate measurements when using such devices. In addition, these types of non-contact sensors are easily susceptible to damage or fault caused by corrosion among other causes.

A number of contact position sensors are currently available for measuring position and/or displacement in response to the distance a probe is moved in which the probe directly contacts the measured surface. Contact position sensors usually include a mechanically actuated spring-loaded probe for forcibly contacting the measured surface. In the past, contact sensors have included a linear potentiometer to directly measure the distance the probe is moved. However, linear potentiometers are basically unsophisticated devices which generally provide poor to moderate accuracy at best.

More recently, a more enhanced contact sensor has been developed which is known as a linear variable differential transformer (LVDT) sensor such as the type manufactured by Schaevitz. LVDT sensors include a transformer which has a movable core disposed in a region between first and second sets of coils. The first set of coils is excited with an alternating current (AC) signal, while the second set of coils receives an induced voltage in response to the AC signal which is based on the position of the movable core. The movable core is axially moved in response to the position of a spring-loaded probe which forcibly contacts the surface under measurement. The LVDT sensor generally provides accurate position measurement, however, the amount of force which results between the probe and the surface under measurement varies according to the position of the probe and compression of the spring among other factors.

While the above-described LVDT sensors have traditionally provided adequate measurement capabilities for a number of applications, there exists a need for a highly precise laboratory measurement device which can exhibit a small controlled amount of force. In particular, there currently exists a need for a precision contact position sensor that would enable a user to measure the position of precision polished optics in which the contact force exerted upon the lens is extremely small. The extremely small contact force is necessary to prevent the probe from exceeding sensitive contact pressures which may damage optics such as the type currently found on large X-Ray telescopes. Thus, one would be able to perform position measurement operations on the surface of the precision polished optics for such purposes as optic engagement, tilt orientation, decenter, metrology engagement and optic disengagement operations as well as emergency proximity sense control without damage to the optic, especially during translation and rotation of the optics.

It is therefore desirable to provide for a contact position sensor which is able to maintain a small controlled amount of force exerted between the contact probe and the surface to be measured. In addition, it is further desirable to provide for a method and system for controlling a contact position sensor so as to achieve the desired amount of force. In particular, it is desirable to provide for such a sensor which enables one to perform measurement operations on optics where the force remains a selected constant and has a very small magnitude. It is further desirable to provide for such a sensor which operates over a wide range and exhibits substantially linear operation.

SUMMARY OF THE INVENTION

In accordance with the teachings of the present invention, a force control system and method are provided for controlling a position contact sensor so as to provide constant contact force therewith. The system includes a contact position sensor having a contact probe for contacting the surface of a target and an output for providing a position indication thereof. An actuator is provided for controllably driving the contact position sensor in response to an actuator control signal. A controller receives the position indication signal and generates in response thereto the actuation control signal so as to provide a substantially constant selected force exerted between the contact sensor and the surface. The actuation drive signal is generated further in response to predetermined force and position data attained from the sensor and the actuator.

BRIEF DESCRIPTION OF THE DRAWINGS

Other objects of the present invention will become apparent to those skilled in the art upon reading the following detailed description and upon reference to the drawings in which:

FIG. 1 is a cross-sectional view of a linear variable differential transformer (LVDT) position contact sensor in combination with a pressure transducer as employed in accordance with the present invention;

FIG. 2 is a wiring schematic which illustrates a transformer employed by the LVDT position contact sensor in combination with an amplifier for generating a position indication signal;

DETAILED DESCRIPTION OF THE PREFERRED EMBODIMENT

Figure 3:
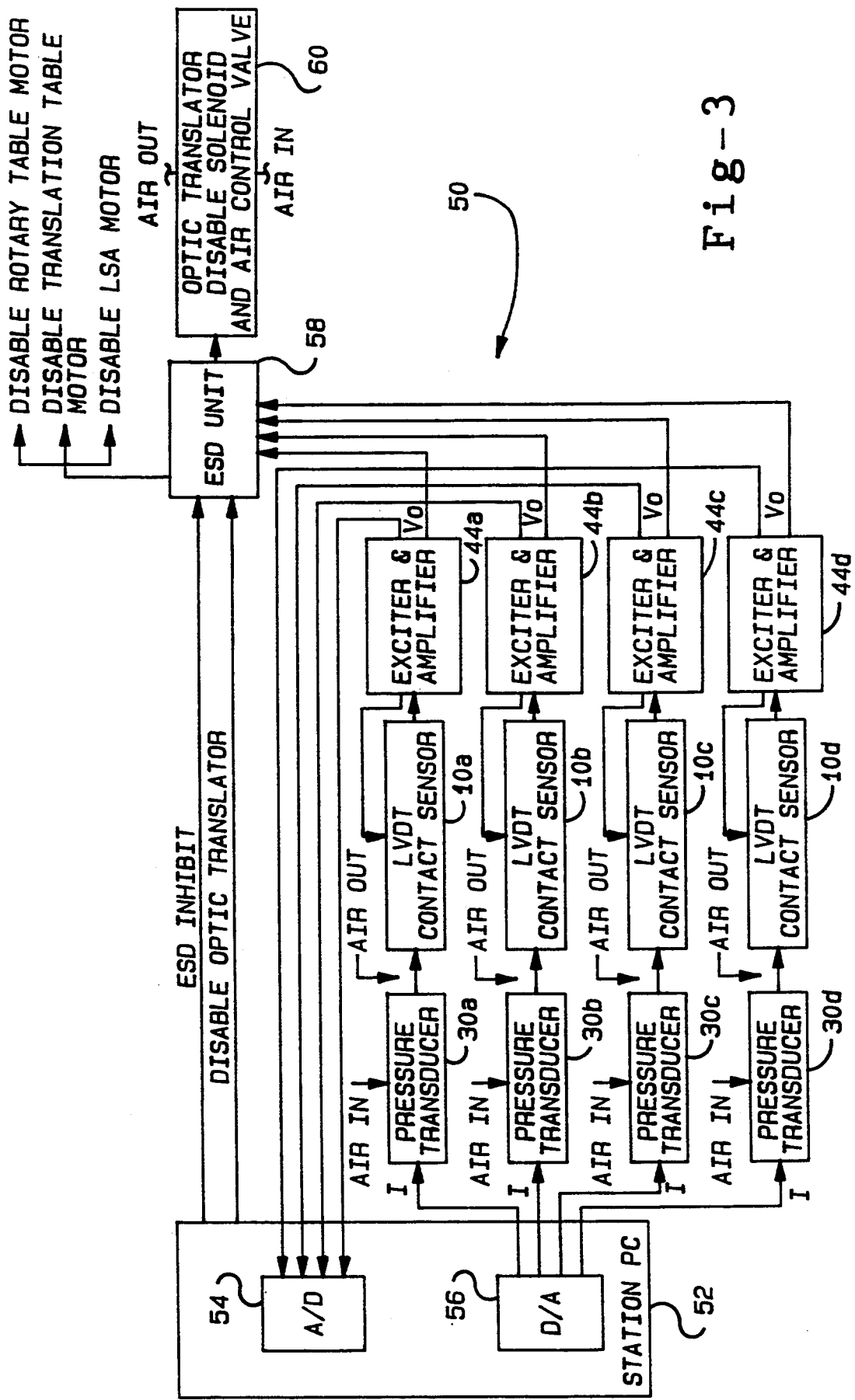
FIG. 3 is a block diagram which illustrates the position contact sensor control system in accordance with one application of the present invention.

Turning now to FIG. 1, a linear variable differential transformer (LVDT) contact position sensor 10 is shown therein operatively coupled to a pressure transducer 30. The LVDT contact position sensor 10 is an air driven spring loaded contact sensor which may include the type manufactured by Schaevitz having model No. LBB-375-TA-100A. While a particular contact position sensor 10 and transducer 30 are shown and described herein in connection with the present invention, other contact sensors and associated transducers may be employed without departing from the spirit of the present invention.

In particular, the LVDT contact position sensor 10 includes a moveable contact probe 12 located within an inner bore of a housing 16. The moveable contact probe 12 has a probe tip 14 which may include a ruby tip ball located at the outermost region of one end of probe 12 for directly contacting a surface that is to be measured therewith. The other end of contact probe 12 is directly coupled to an air-actuated piston 20. Piston 20 provides forcible actuation in response to air or gas pressure supplied to a pressurized air chamber 22 via an air inlet port 26. In addition, a coil spring 18 is operatively coupled between piston 20 and an inner portion of housing 16 for providing a substantially linear spring compression loading between probe 12 and housing 16. In order to facilitate movement of probe 12, a plurality of roller bearings 24 are further disposed between the outer perimeter of probe 12 and housing 16.

The pressure transducer 30 provides controlled air pressure to air chamber 22 of sensor 10 in response to an input control current I. The pressure transducer 30 includes an air inlet port 32 for receiving pressurized air from an air supply and an output port 36 for providing a metered air pressure output. The pressure transducer 30 further includes a flapper valve 34 which controls the flow of pressurized air exiting via output port 36 in response to the input control current I. Pressure transducer 30 may include a commercially available pressure transducer such as the type manufactured by Fairchild and having Model No. TA6000-44.

The LVDT contact position sensor 10 further includes a transformer 39 which is shown in detail according to a circuit diagram provided in FIG. 2. The transformer 39 has a moveable core 28 which moves in conjunction with contact probe 12 through a region between a primary coil 38 and a center-tapped secondary coil 40. The primary coil 38 is excited with an alternating current (AC) voltage signal $V_{AC}$ that is supplied from an exciter 42. The primary coil 38 and secondary coil 40 are arranged substantially symmetrical with respect to one another and operate such that the primary coil 38 induces a voltage on the secondary coil 40 which is dependent upon the position of the moveable core 28.

An amplifier 44 is electrically coupled to the secondary coil 40 for receiving the voltage induced thereon. Accordingly, the voltage induced on secondary coil 40 is amplified by amplifier 44 to produce an amplified output voltage $V_o$. In effect, the amplified output voltage $V_o$ is a position indication signal which essentially represents the relative position of moveable contact probe 12.

According to the sensor arrangement described thus far, LVDT contact position sensor 10 is generally employed such that the contact probe 12 extends axially toward and contacts the surface of a target to be measured. Upon contact with the surface, probe tip 14 exerts an amount of force upon the measured surface which depends on the actuation force exerted against probe 12 and the compression of coil spring 18. Generally speaking, increased air pressure within air chamber 22 forces piston 20 to further compress spring 18 and thereby increases the amount of force exerted by probe tip 14. According to many conventional position sensing approaches, sensor 10 applies a sensor tip force that is proportional to the contact sensor spring constant. This leads to an amount of applied force which varies according to the position of probe 12. This leads to varying amounts of force and could cause excessive force loading according to such conventional approaches.

The present invention eliminates undesirable changes in the amount of force and/or excessive force loading by providing a controlled force as discussed hereinafter according to a preferred embodiment. With particular reference to FIG. 3, one embodiment of a contact position sensor force control system 50 is shown therein for providing position measurement operations. According to this approach, sensor force control system 50 may advantageously provide position measurements for precision polished optics in which a small controlled contact force F is exerted between a lens to be measured and the probe tip 14. Such a need currently exists for performing measurement operations for optic engagement, metrology engagement, tilt orientation, decenter and optic disengagement operations, as well as providing emergency proximity sensor control during translation and rotation of the optics.

The contact position sensor force control system 50 as described herein includes four LVDT contact position sensors 10a through 10d which are generally mounted in a predetermined arrangement onto a toroid lens assembly. The mounting arrangement allows each sensor to contact and measure the position of the surface of a selected target according to a particular use. For instance, by locating sensors 10a through 10d at different locations, a number of simultaneous measurements may allow for decenter operations. Each of contact sensors 10a through 10d are operatively coupled to one of pressure transducers 30a through 30d, respectively. In addition, each of contact sensors 10a through 10d receives an AC voltage signal $V_{AC}$ from, and supplies an output voltage to, one of the combined exciter and amplifier units 44a through 44d, respectively. In turn, each of amplifiers 44a through 44d generates the position indication voltage signal $V_o$.

A station personal computer (PC) 52 is provided for controlling the operation of contact position sensor force control system 50. The station personal computer 52 may include a standard off-the-shelf PC which generally has processing and memory capabilities. Computer 52 receives each of the amplified position indication voltage signals $V_o$ via an analog-to-digital converter 54. The position indication voltage signals $V_o$ thereby provide the computer 52 with an indication of the relative position of the probe 12 for each of contact sensors 10a through 10d.

Computer 52 processes the position indication voltage signals $V_o$ along with other selected data so as to generate current control signals I for controlling the air pressure supplied by pressure transducers 30a through 30d. In doing so, the current control signals I are supplied to pressure transducers 30a through 30d via a digital-to-analog converter 56. The analog-to-digital converter 54 and digital-to-analog converter 56 may be a part of or separate from computer 52 and serve to allow digital processing for an analog sensing system. According to this arrangement, computer 52 provides feedback control to each of contact sensors 10a through 10d for purposes of controlling the amount of force F exerted by contact tip 14 upon a surface to be measured.

In addition, the contact position sensor force control system 50 further includes an emergency shut-down (ESD) unit 58 which also receives the amplified position indication voltage signal $V_o$. The ESD unit 58 is coupled to an optic translator disable solenoid and air control valve 60. Accordingly, the ESD unit 58 monitors each of the position indication signals $V_o$ and, in response to the detection of predetermined values, the ESD unit 58 may shut down the operation of any selected operating systems such as the optic translator. In doing so, the shutdown may be accomplished by disabling a solenoid in the air control valve or any of the rotary table motor, translation table motor, or LSA Linear slide assembly motor.

Figure 4:
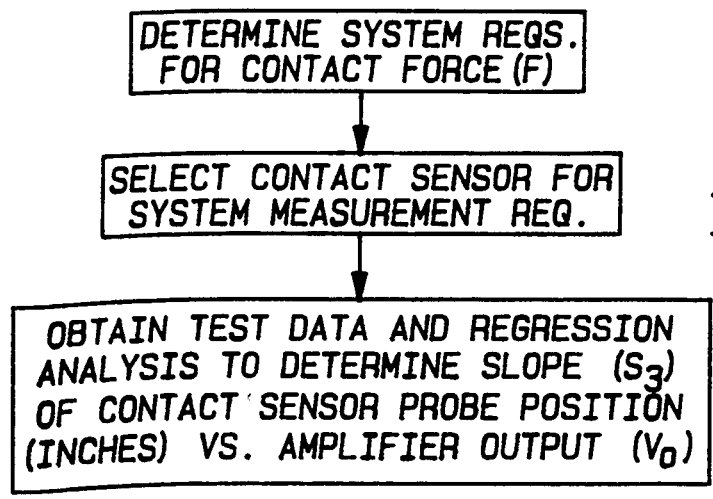
FIG. 4 is a flow diagram which illustrates the selection of a position contact sensor and linear data analysis thereof according to the present invention.
Figure 5:
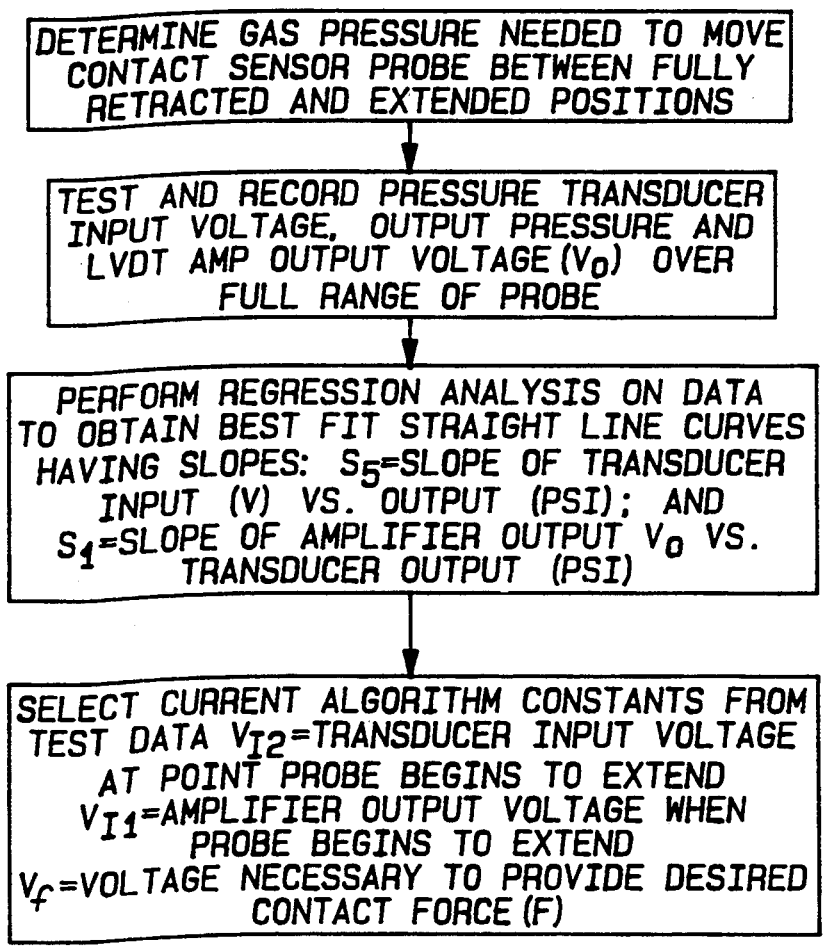
FIG. 5 is a flow diagram which illustrates the selection of a pressure transducer, linear data analysis and processing functions for a linear transfer function in accordance with the present invention.
Figure 6:
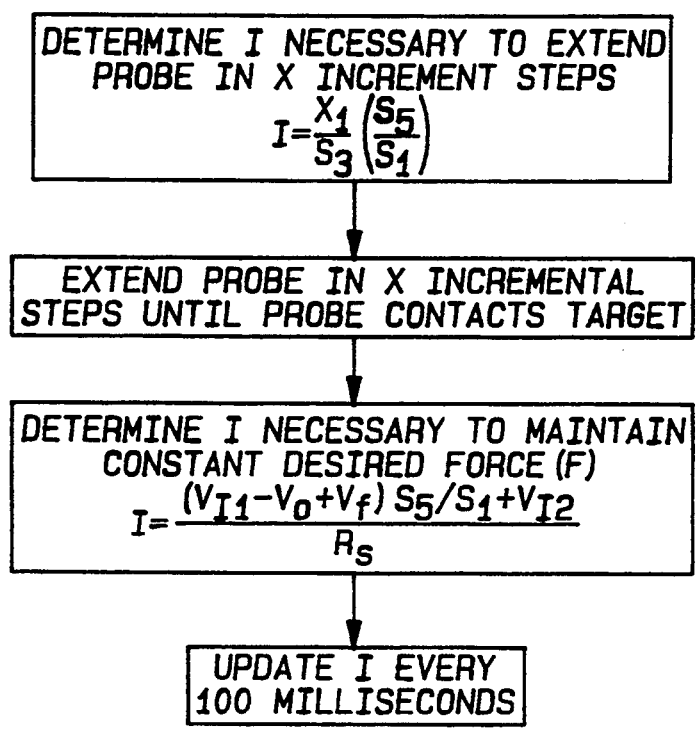
FIG. 6 is a flow diagram which illustrates the continued processing employed according to one application of the present invention.

The sensor force control system 50 advantageously provides feedback control via computer 52. In so doing, computer 52 is programmed to receive predetermined information regarding the substantially linear operation of each of the contact sensors 10a through 10d, pressure transducers 30a through 30d and amplifiers 44a through 44d. Turning to FIGS. 4 through 6, there are shown flow diagrams which illustrate the control algorithm from which computer 52 determines the control current I that is necessary to control contact sensor 10 and provide a constant selected force F throughout the travel range of probe 12.

As provided in FIG. 4, the system requirements for the desired contact force F are initially determined for the particular application. The contact sensor 10 is then selected in accordance with the contact force F and measurement requirements for the particular application. Next, a straight line calibration curve is determined so as to obtain a slope $S_3$ of contact sensor probe position (D) versus amplifier output voltage ($V_o$). Slope $S_3$ is obtained based on measured data obtained over the substantially linear range operation of probe 12. The measured data is gathered from preliminary measurements taken between the fully retracted and extended positions of probe 12 and the measured data is then plotted. To optimize linearity of the measured data, linear least squares regression analysis is performed to obtain the best fit curve which exhibits slope $S_3$.

Referring to FIG. 5, the amount of air pressure necessary to move the contact probe 12 between the fully retracted and extended positions is determined. Next, the pressure transducer input voltage, output pressure and amplifier output voltage $V_o$ are measured and data is recorded over the full range of movement of probe 12. Linear least squares regression analysis is then performed on this recorded data to obtain the best fit straight line curves from which slopes $S_5$ and $S_1$ are determined. Slope $S_5$ represents the slope of a linear approximation curve of the transducer input voltage (Volts) versus output pressure (PSI). Slope $S_1$ represents the slope of a linear approximation curve of the amplifier voltage output $V_o$ (Volts) versus transducer output pressure (PSI).

Based on the measured data, constants are selected from the measured data to obtain the transducer input voltage $V_{12}$ at a point where the probe 12 begins to extend and the amplifier output voltage $V_{f1}$ at a point when the probe begins to extend. In addition, a voltage constant $V_f$ necessary to provide the constant selected force F is next determined based on known characteristics of sensor 10. That is, the voltage constant $V_f$ may be determined from known experimental data (i.e., the voltage constant $V_f$ which provides one PSI exhibits ten grams of force).

Next, the control current I that is necessary to extend the contact probe 12 in selected incremental steps is determined for purposes of extending the probe 12 from a retracted position to a position which contacts the surface to be measured. Accordingly, the probe 12 is extended in accordance with selected incremental steps such as 0.006 inches per step until the probe 12 contacts such a target.

The above gathered data is stored in the memory of the computer 52 and processed according to a current control algorithm which is programmed in the computer 52 generally in the form of software. In addition, a source resistance $R_s$ value is further programmed into the computer 52. Based on this data, the control current I that is necessary to maintain a constant desired force F on the target is determined based on the following equation:

$$I = \frac{(V_{I1} - V_o + V_f) S_5/S_1 + V_{I2}}{R_s}$$

The above-mentioned steps for determining the control current I are then repeated at a rate of approximately 100 milliseconds (100 MS). Accordingly, computer 52 updates the control current (I) necessary to maintain the selected force F between the probe 12 and surface being measured. In addition, it may be necessary to retract and re-extend probe 12 repeatedly over a distance when the probe 12 is not in contact with the surface to be measured. In doing so, the control current (I) is set to zero so as to remove air pressure supplied by pressure transducer 30 and thereby cause the probe 12 to retract. To re-extend, the probe 12 is extended in accordance with the incremental step approach described above.

In operation, the contact position sensor force control system 50 may be set up to provide position measurements for precision polished optics such as the type commonly found in an Advanced X-Ray Astrophysics Facility (AXAF). More particularly, the position measurements include measuring the surface of precision polished optics from the toroid lens during operations involving tilt, optic engagement, decenter, metrology engagement and optic disengagement operations, as well as providing emergency proximity sense control, particularly during the actual translation and rotation of the optic. During such operations, a very small constant force on an order of magnitude of approximately ten grams is generally desired to prevent damage to the optics.

Accordingly, the contact sensor 10, transducer 30 and amplifier 44 are each selected and measured test data is obtained so as to determine the necessary characteristics of each of these components over a substantially linear range of operation. The personal computer (PC) 52 stores such information in memory. During the actual measurement operation, computer 52 receives the position indication signal $V_o$ and processes the position indication signal $V_o$ according to a current control algorithm so as to determine the control current I necessary to drive pressure transducer 30. While the control current I will vary according to the location of probe 12 the force will remain substantially constant throughout the range of motion of probe 12. That is, when probe 12 extends and retracts while contacting a rotating or translating surface which has surface contour changes, the contact force will remain constant.

From an initial position of initial retraction, probe 12 is incrementally extended until contacting the surface to be measured. In doing so, the control current I is incrementally increased until contact is determined. Computer 52 processes the position indication signal $V_o$ and determines the necessary control current I required to maintain a constant selected force F between probe 12 and the surface of the target lens being measured, as well as the current I necessary to move target positions.

According to the force control system 50 described herein, the amount of constant controllable force F may include a force of less than thirteen grams.

While the present invention has been disclosed herein in connection with a control system 50 for controlling LVDT contact position sensor 10 for purposes of providing position measurements for optics, especially those that require very low controlled force exertion thereupon, it is conceivable that the control system 50 may be employed for a number of other applications. For instance, control system 50 may be employed to provide a constant force control for purposes of enabling controlled insertion of a contact lens over the outer surface of an eyeball. In addition, it is conceivable that such a control system 50 may further be employed for purposes of enhancing the movement of a needle or other surgical device which may desire the use of a controlled contact probe.

In view of the foregoing, it can be appreciated that the present invention enables the user to achieve a controlled force contact position sensing system 50 which achieves a constant force over a significant linear range. Thus, while this invention has been disclosed herein in combination with a particular example thereof, no limitation is intended thereby except as defined in the following claims. This is because a skilled practitioner recognizes that other modifications can be made without departing from the spirit of this invention after studying the specification and drawings.

What is claimed is:

1. A constant contact force control position sensing system comprising:
    contact position sensor means having a contact probe for contacting a surface to be measured and an output for providing a position indication signal;
    actuation means for controllably actuating said contact probe in response to an actuation control signal;
    means for generating predetermined force and position data obtained from said sensor means and actuation means; and
    control means, including computer means for processing said predetermined force and position data and said position indication signal and generating in response thereto said actuation control signal so as to provide a substantially constant selected force between said contact probe and said surface.

2. The system as define din claim 1 wherein said control means generates said actuation control signal in response to a substantially linear approximation curve of probe pressure versus probe position which is obtained from regression analysis of said predetermined force and position data.

3. The system as defined in claim 2 wherein said control means further generates said actuation control signal in response to a substantially linear approximation curve of said actuating means obtained from regression analysis of said force and position predetermined data.

4. The system as defined in claim 1 further comprising amplification means coupled between said probe and said control means for providing said position indication signal.

5. The system as defined in claim 1 wherein:
    said sensor means includes a piston operatively coupled between said contact probe and an air chamber; and said actuation means comprises a pneumatic actuator for providing controlled air pressure to said air chamber.

6. The system as defined in claim 1 further comprising disabling means for disabling said actuation of said contact sensor upon sensing a predetermined position indication signal.

7. The system as defined in claim 1 wherein said constant contact force control system operatively measures the position of an optical lens while maintaining a substantially constant force over a wide range of motion of said probe.

8. The system as defined in claim 7 wherein said constant contact force control system measures said optical lens during rotation and translation thereof.

9. The system is defined in claim 8 wherein said contact force control system provides a contact force over a series of incremental steps.

10. A force control system for controlling the position of a contact sensor so as to provide a constant contact force therewith, said system comprising:
actuation means for controllably driving said contact sensor in response to a position indication signal;
means for providing substantially linear approximation curves based on predetermined data obtained from said contact sensor and said actuation means; and
control means including computer means, for processing said position indication signal and said substantially linear approximation curves to generate an actuation control signal so as to provide a substantially constant selected force applied between said contact probe and a surface to be measured.

11. The system as defined in claim 10 wherein said control means provides an actuation control signal in response to a linear approximation curve of probe pressure versus probe position provided by linear regression analysis.

12. The system as defined in claim 11 wherein said control means further generates said actuation control signal in response to a substantially linear approximation curve of said actuation means obtained from regression analysis of said predetermined data.

13. The system as defined in claim 10 further comprising amplification means coupled between said probe and said control means for providing said position indication signal.

14. The system as defined in claim 10 wherein:
said sensor means includes a piston operatively coupled between said contact probe and an air chamber; and
said actuation means comprises a pneumatic actuator for providing controlled air pressure to said air chamber.

15. The system as defined in claim 10 wherein said constant contact force control system operatively measures the position of an optical lens while maintaining a substantially constant force over a wide range of motion of said probe.

16. The system as defined in claim 15 wherein said constant contact force control system measures said optical lens during rotation and translation thereof.

17. A method for providing constant contact force control to a contact position sensor comprising:
obtaining substantially linear approximation curves based on predetermined response data obtained from said contact position sensor and an actuator;
receiving a position indication signal which represent the position of said sensor;
processing said linear approximation curves and said position indication signal so as to generate an actuator drive signal;
providing said actuator control signal to said actuator; and
actuating said contact sensor in response to said actuation means so as to maintain a substantially constant selected force over a wide range of sensor movement.

18. The method as define in claim 17 wherein said step of obtaining said substantially linear approximation curves comprises:
measuring said contact sensor and actuator and recording data therefrom; and
performing regression analysis on said recorded data to obtain best fit curves.

19. The method as defined in claim 17 further comprising the step of amplifying said position indication signal.

20. The system as defined in claim 10 wherein said contact force control system provides a constant force over a series of incremental steps.

21. The method as defined in claim 17 wherein said actuating step includes applying a force in a series of incremental steps.

* * * * *